(12) United States Patent
Cook

(10) Patent No.: US 9,376,349 B2
(45) Date of Patent: Jun. 28, 2016

(54) PELLETIZED FERTILIZER AND METHOD FOR MANUFACTURING FERTILIZER

(71) Applicant: Reinhart Robert Cook, Vermontville, MI (US)

(72) Inventor: Reinhart Robert Cook, Vermontville, MI (US)

(*) Notice: Subject to any disclaimer, the term of this patent is extended or adjusted under 35 U.S.C. 154(b) by 0 days.

(21) Appl. No.: 14/471,776

(22) Filed: Aug. 28, 2014

(65) Prior Publication Data

US 2016/0060182 A1 Mar. 3, 2016

(51) Int. Cl.
| | |
|---|---|
| C05F 3/00 | (2006.01) |
| C05F 11/00 | (2006.01) |
| C05B 17/00 | (2006.01) |
| C05C 11/00 | (2006.01) |
| C05D 3/02 | (2006.01) |
| C05D 9/00 | (2006.01) |
| C05D 9/02 | (2006.01) |
| C05G 3/00 | (2006.01) |

(52) U.S. Cl.
CPC .............. *C05B 17/00* (2013.01); *C05C 11/00* (2013.01); *C05D 3/02* (2013.01); *C05D 9/00* (2013.01); *C05D 9/02* (2013.01); *C05F 3/00* (2013.01); *C05F 11/00* (2013.01); *C05G 3/0058* (2013.01)

(58) Field of Classification Search
CPC ........................................................ C05F 3/00
USPC ....................................................... 71/11–63
See application file for complete search history.

(56) References Cited

U.S. PATENT DOCUMENTS

| | | | | |
|---|---|---|---|---|
| 2,797,985 | A * | 7/1957 | Larson ................................ 71/8 |
| 6,413,291 | B1 * | 7/2002 | Wommack et al. ............... 71/15 |
| 6,783,567 | B1 * | 8/2004 | Waters et al. ...................... 71/24 |
| 6,916,426 | B2 * | 7/2005 | Van Slyke ................. C02F 9/00 210/666 |
| 8,685,131 | B2 * | 4/2014 | van Slyke ................. C02F 9/00 71/15 |
| 2003/0061758 | A1 * | 4/2003 | Wilson ............................. 43/124 |
| 2007/0062231 | A1 * | 3/2007 | Spindler et al. ................... 71/11 |
| 2007/0272609 | A1 * | 11/2007 | Suri et al. ....................... 210/603 |
| 2011/0283759 | A1 * | 11/2011 | Cisneros et al. .................. 71/21 |
| 2013/0316903 | A1 * | 11/2013 | Hughes .......................... 504/102 |
| 2015/0197459 | A1 * | 7/2015 | Hill, Jr. .................... C05F 11/08 71/8 |

FOREIGN PATENT DOCUMENTS

| | | | |
|---|---|---|---|
| DE | 4119504 | * | 12/1992 |
| DE | 19644613 | * | 4/1998 |
| WO | 03/018512 | * | 3/2003 |

* cited by examiner

*Primary Examiner* — Wayne Langel
(74) *Attorney, Agent, or Firm* — Price Heneveld LLP

(57) ABSTRACT

A method for manufacturing a pelletized fertilizer includes providing an animal waste, providing calcium sulfate dihydrate, blending the animal waste and the calcium sulfate dihydrate together such that a resulting mixture of the animal waste and the calcium sulfate dihydrate comprises between about 10 % and about 75 % animal waste and between about 10 % and 50 % calcium sulfate dihydrate, and forming the mixture into pellets by pelletizing the mixture.

22 Claims, 2 Drawing Sheets

PELLETIZED FERTILIZER AND METHOD FOR MANUFACTURING FERTILIZER

BACKGROUND OF THE INVENTION

The present invention relates to a method for manufacturing a pelletized fertilizer comprising an animal waste and calcium sulfate dihydrate, a method for fertilizing a soil with the pelletized fertilizer, and a related fertilizer.

BRIEF SUMMARY OF THE INVENTION

One aspect of the present invention is a method for manufacturing a pelletized fertilizer that includes providing an animal waste, providing calcium sulfate dihydrate, blending the animal waste and the calcium sulfate dihydrate together such that a resulting mixture of the animal waste and the calcium sulfate dihydrate comprises between about 10% and about 75% animal waste and between about 10% and 50% calcium sulfate dihydrate, and forming the mixture into pellets by pelletizing the mixture.

Another aspect of the present invention is a method for applying a fertilizer that includes providing an animal waste, providing calcium sulfate dihydrate, blending the animal waste and the calcium sulfate dihydrate together such that a resulting mixture of the animal waste and the calcium sulfate dihydrate comprises between about 50% and about 75% animal waste and between about 10% and 25% calcium sulfate dihydrate, and forming the mixture into pellets by pelletizing the mixture.

Yet another aspect of the present invention is a pelletized fertilizer that includes an animal waste, and an amount of calcium sulfate dihydrate, wherein the pelletized fertilizer comprises about 10%-25% calcium sulfate dihydrate.

The present inventive method and related fertilizer is efficient in use, economical to manufacture, and is particularly well adapted for the proposed use by providing a natural, non-synthesized fertilizer that maximizes the relatively long-term retention and beneficial properties of nitrogen contained within an animal waste while simultaneously reducing unwanted characteristics associated with using animal waste as a fertilizer, including detracting odors, the attraction of pests, and the like.

These and other features, advantages, and objects of the present invention will be further understood and appreciated by those skilled in the art by reference to the following specification, claims, and appended drawings.

DETAILED DESCRIPTION

It is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
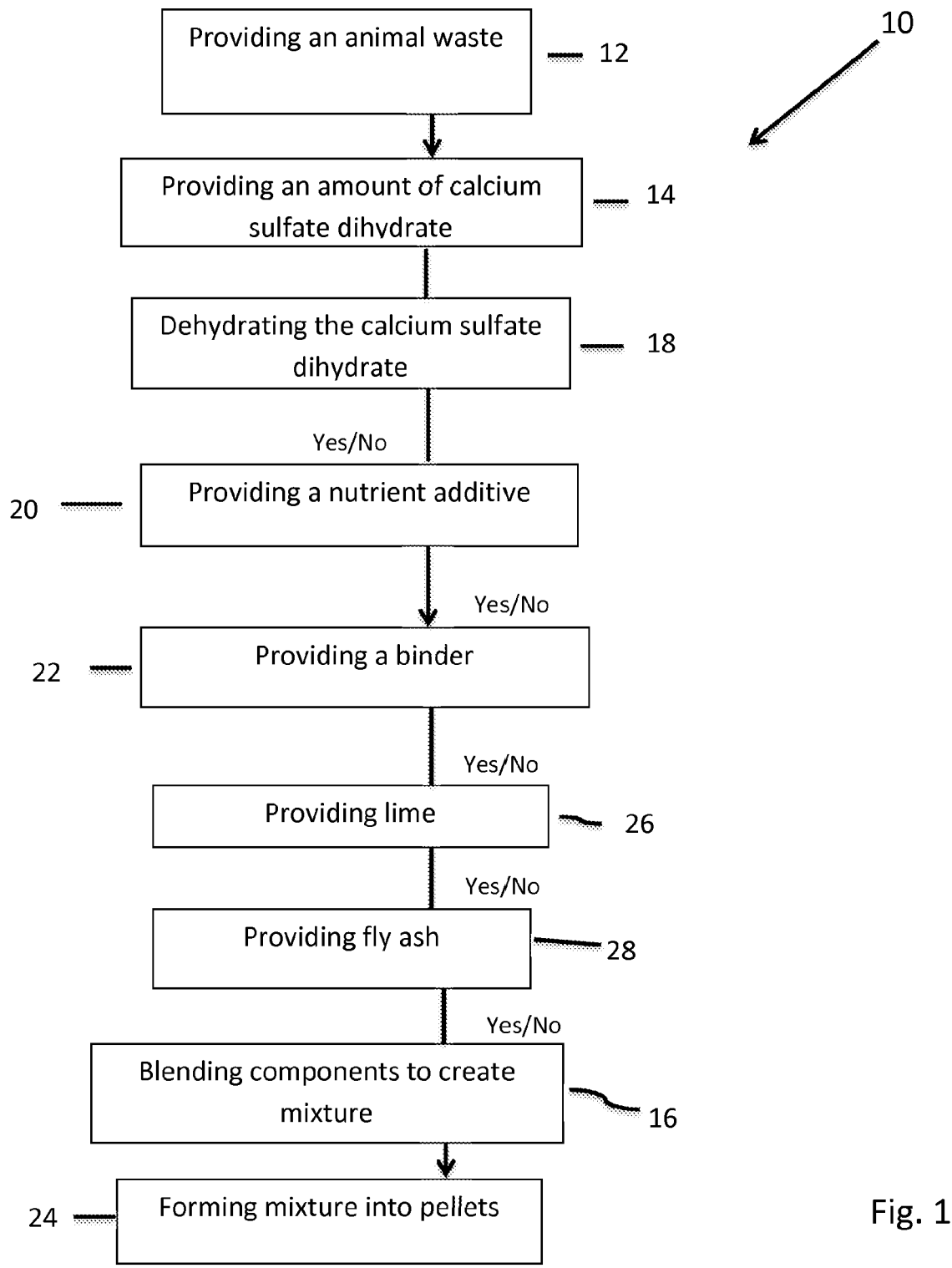
FIG. 1 is a flowchart illustrating steps of a method for manufacturing a pelletized fertilizer.

The present inventive method for manufacturing a pelletized fertilizer 10 (FIG. 1) includes the step of providing an animal waste 12 such as manure, the step of providing an amount of gypsum or calcium sulfate dihydrate 14, and the step of blending the animal waste and gypsum into a mixture 16. The animal waste may preferably be provided from various domestic farm animals and animals including, but not limited to, cattle, pigs, chickens or other poultry, horses, goats, sheep, and the like. In addition, and for the purposes of this application, the term animal waste includes waste from humans. Further the animal waste may be preferably provided in the form of slurry, but may also be provided in a dried form such as loose or in pellet form. The gypsum may be collected from various sources, such as from power plants, recycled drywall and the like, or from naturally occurring deposits. The gypsum may also preferably be provided in the form of a slurry, but may also be provided in a dried form. In an alternative embodiment, the method may include the step of dehydrating the gypsum 18 prior to the step of blending the components to create the mixture 16.

Preferably, the resulting mixture of the animal waste and the gypsum includes between about 10% and 75% animal waste and between about 10% and 50% gypsum, more preferably between 50% and 75% animal waste and between 10% and 25% gypsum, and most preferably between 70% and 75% animal waste and between 20% and 25% gypsum.

In another embodiment, the method may further include the step of providing a nutrient additive 20 and then blending the nutrient additive along with the animal waste and the gypsum in step 16. The nutrient additive preferably includes boron, calcium, carbon, copper, iron, magnesium, manganese, molybdenum, nitrogen, phosphorus, sulfur and/or zinc. In yet another embodiment, the method may further include the step of providing a binder 22 and then blending the binder with the animal waste and the gypsum in step 16. The binder preferably includes lignin sulfonate, molasses, syrups, such as maple syrup, corn syrup, etc., and the like. In another embodiment, the method may further include the step of providing an amount of lime 26 that is blended with the animal waste and the gypsum in step 16. In certain instances, the lime or other components may be provided in a relatively wet or hydrated form. In these instances, the method may further include the step of providing an amount of fly ash 28. The fly ash is provided in a relatively dry condition such that the resultant mixture may be readily processed or formed into pellets or granules. The fly ash may be collected from power plants, and the like, as a result of the associated combustion process. It is noted that fly ash may also function as a binder within the mixture as discussed above.

It is noted that the components used to create the mixture in step 16 may be added in any order with respect to one another, and that the blending in step 16 may be conducted on any sub-grouping of the eventual total components, with some components being added during or subsequent to blending of certain other components.

It is noted that the amount of nitrogen present in the animal waste diminishes rapidly once the animal waste is excreted from the animal. Specifically, the animal waste or manure begins to "gas" or when ammonia begins to escape from the manure, thereby denitrifying the animal waste, reducing the amount of nitrogen contained within the animal waste. Therefore, the step of blending the components 16 preferably occurs within 48 hours of the animal waste exiting the animal, more preferably within 24 hours, and most preferably within 4 hours.

The method further includes the step of forming the mixture in pellets or pelletizing or granulating the mixture 24. The pelletizing step 24 may be conducted by any method known in the art, such as by compression, by extrusion, gear compression, etc., by pan or disk pelletizing, spheronization, or any other known method. Generally any method for compressing or molding the mixture into the shape of a pellet may be utilized. It is noted that granulated forms of the mixture may also be created and that the granulated forms are to be construed as small, non-dimensional specific pellets for the purposes of the disclosure herein.

Figure 2:
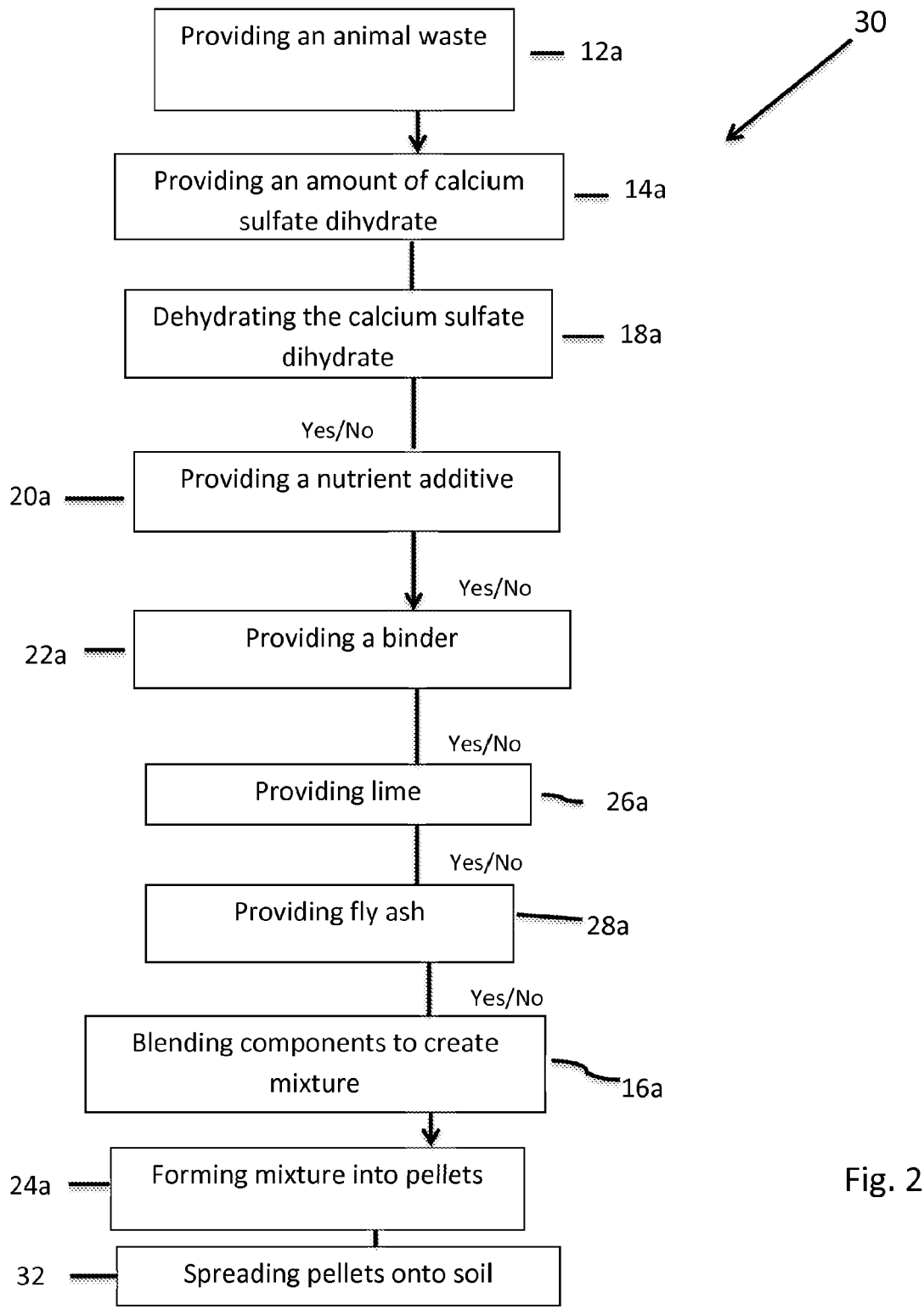
FIG. 2 is a flowchart illustrating steps of a method for fertilizing a soil with a pelletized fertilizer.

A method for fertilizing a soil 30 (FIG. 2) includes utilizing the pelletized fertilizer formed from the method for manufacturing a pelletized fertilizer 10 (FIG. 1) to fertilize a soil. Since the method for fertilizing a soil 30 includes similar steps as the method for manufacturing a pelletized fertilizer, similar steps appearing in FIG. 1 and FIG. 2, respectively, are represented by the same corresponding reference numeral, except for the suffix "a" appearing in the numerals of the latter. In the illustrated example, the method of fertilizing a soil 30 includes the step of spreading the pellets onto a soil 32, such that the pellets can be subsequently hydrated and mixed with the soil. Spreading the pellets can be accomplished by various methods, such as broadcasting, banding and the like, either prior to or subsequent to sowing a crop within the soil.

The present inventive method and related fertilizer is efficient in use, economical to manufacture, and is particularly well adapted for the proposed use by providing a natural, non-synthesized fertilizer that maximizes the relatively long-term retention and beneficial properties of nitrogen contained within an animal waste while simultaneously reducing unwanted characteristics associated with using animal waste as a fertilizer, including detracting odors, the attraction of pests, and the like.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for manufacturing a pelletized fertilizer, comprising:
   providing an animal waste;
   providing calcium sulfate dihydrate;
   blending the animal waste and the calcium sulfate dihydrate together such that a resulting mixture of the animal waste and the calcium sulfate dihydrate comprises between about 70% and about 75% animal waste and between about 20% and 25% calcium sulfate dihydrate; and
   forming the mixture into pellets by pelletizing the mixture.

2. The method of claim 1, further comprising:
   providing a nutrient additive selected from the group consisting of boron, calcium, copper, iron, magnesium, manganese, molybdenum, nitrogen, phosphorus, potassium, sulfur and zinc; and
   wherein the step of blending the nutrient additive with the animal waste and the calcium sulfate dihydrate includes blending the nutrient additive.

3. The method of claim 1, further comprising:
   providing a binder; and
   wherein the blending step also includes blending the binder with the animal waste and the calcium sulfate dihydrate.

4. The method of claim 3, wherein the step of providing the binder includes providing lignin sulfonate.

5. The method of claim 1, further comprising:
   providing lime; and
   wherein the blending step also includes blending the lime with the animal waste and the calcium sulfate dihydrate.

6. The method of claim 1, further comprising:
   providing fly ash; and
   wherein the blending step also includes blending the fly ash with the animal waste and the calcium sulfate dihydrate.

7. The method of claim 6, wherein the step of providing the fly ash includes providing the fly ash with a low moisture content to absorb water from the remaining components of the mixture during the blending step.

8. The method of claim 1, further comprising:
   dehydrating the calcium sulfate dihydrate prior to the step of blending the animal waste with the calcium sulfate dihydrate.

9. A method for manufacturing a pelletized fertilizer, comprising:
   providing an animal waste;
   providing calcium sulfate dihydrate;
   blending the animal waste and the calcium sulfate dihydrate together such that a resulting mixture of the animal waste and the calcium sulfate dihydrate comprises between about 70% and about 75% animal waste and between about 20% and 25% calcium sulfate dihydrate; and
   forming the mixture into pellets by pelletizing the mixture, and wherein the step of blending the animal waste with the calcium sulfate dihydrate is complete within about 48 hours of the animal waste exiting the animal.

10. The method of claim 9, wherein the step of blending the animal waste with the calcium sulfate dihydrate is complete within about 24 hours of the animal waste exiting the animal.

11. The method of claim 10, wherein the step of blending the animal waste with the calcium sulfate dihydrate is complete within about 4 hours of the animal waste exiting the animal.

12. A method for applying a fertilizer, comprising:
   providing an animal waste;
   providing calcium sulfate dihydrate;
   blending the animal waste and the calcium sulfate dihydrate together such that a resulting mixture of the animal waste and the calcium sulfate dihydrate comprises between about 70% and about 75% animal waste and between about 20% and 25% calcium sulfate dihydrate;
   forming the mixture into pellets by pelletizing the mixture; and
   spreading the pellets onto a soil such that nitrogen from the animal waste is released into the soil when the pellets are hydrated.

13. The method of claim 12, further comprising:
   providing a nutrient additive selected from the group consisting of boron, calcium, copper, iron, magnesium, manganese, molybdenum, nitrogen, phosphorus, potassium, sulfur and zinc; and
   wherein the step of blending the nutrient additive with the animal waste and the calcium sulfate dihydrate.

14. The method of claim 12, further comprising:
   providing a binder; and
   wherein the blending step also includes blending the binder with the animal waste and the calcium sulfate dihydrate.

15. The method of claim 14, wherein the step of providing the binder includes providing lignin sulfonate.

16. The method of claim 12, further comprising:
   providing lime; and
   wherein the blending step also includes blending the lime with the animal waste and the calcium sulfate dihydrate.

17. The method of claim 12, further comprising:
providing fly ash; and
wherein the blending step also includes blending the fly ash with the animal waste and the calcium sulfate dihydrate.

18. The method of claim 17, wherein the step of providing the fly ash includes providing the fly ash with a low moisture content to absorb water from the remaining components of the mixture during the blending step.

19. The method of claim 12, further comprising;
dehydrating the calcium sulfate dihydrate prior to the step of blending the animal waste with the calcium sulfate dihydrate.

20. A method for applying a fertilizer, comprising:
providing an animal waste;
providing calcium sulfate dihydrate;
blending the animal waste and the calcium sulfate dihydrate together such that a resulting mixture of the animal waste and the calcium sulfate dihydrate comprises between about 70% and about 75% animal waste and between about 20% and 25% calcium sulfate dihydrate;
forming the mixture into pellets by pelletizing the mixture; and
spreading the pellets onto a soil such that nitrogen from the animal waste is released into the soil when the pellets are hydrated; and,
wherein the step of blending the animal waste with the calcium sulfate dihydrate is complete within about 48 hours of the animal waste exiting the animal.

21. The method of claim 20, wherein the step of blending the animal waste with the calcium sulfate dihydrate is complete within about 24 hours of the animal waste exiting the animal.

22. The method of claim 21, wherein the step of blending the animal waste with the calcium sulfate dihydrate is complete within about 4 hours of the animal waste exiting the animal.

* * * * *